United States Patent [19]
Downs

[11] 3,938,340
[45] Feb. 17, 1976

[54] FISH HOLDING CHAMBER

[75] Inventor: Dallas I. Downs, Montrose, Calif.

[73] Assignee: Southern California Edison Company, Rosemead, Calif.

[22] Filed: Jan. 23, 1974

[21] Appl. No.: 436,010

[52] U.S. Cl. .................................................. 61/21
[51] Int. Cl.² .......................................... E02B 8/08
[58] Field of Search ............ 61/21; 119/2, 3; 43/100

[56] References Cited
UNITED STATES PATENTS

| | | | |
|---|---|---|---|
| 1,380,384 | 6/1921 | Howard | 61/21 |
| 2,683,969 | 7/1954 | Mugnier | 61/21 |
| 2,826,897 | 3/1958 | Vinsonhaler et al. | 61/21 |
| 3,377,805 | 4/1968 | Warner | 61/21 |
| 3,596,468 | 8/1971 | Fairbanks | 61/21 |
| 3,820,342 | 6/1974 | Stipanov | 61/21 |

*Primary Examiner*—Jacob Shapiro
*Attorney, Agent, or Firm*—Lyon & Lyon

[57] ABSTRACT

A fish holding chamber for use with a water intake system which includes a watercourse through which water is drawn from a body of water containing fish and debris and a fish diversion or debris removal structure mounted across the watercourse, the fish holding chamber being located at one end of the diversion or removal structure for receiving and maintaining fish diverted from the water in the watercourse for return to the body of water.

17 Claims, 6 Drawing Figures

FISH HOLDING CHAMBER

BACKGROUND OF THE INVENTION

The invention disclosed herein relates to the intake of water from a body of water containing fish under circumstances where it is desired to hold injury to fish unavoidably drawn in with the water to a minimum. For example, in steam electric generating stations water from the body of water is utilized as cooling water which is circulated through condensors to cool and condense the steam discharged from the turbine. This cooling is essential to the efficiency of the thermocycle. In generating stations located along ocean coast lines or lakes and rivers it is common to pump cooling water directly from the adjacent body of water, pass it through the cooling system one time and then discharge the water. These systems are known as "once through cooling systems."

Such systems normally obtain water from the adjacent body of water by running pipes out into the body of water. Water is drawn into a bowl-like conduit structure having an upwardly facing intake orifice and then flows shoreward through the pipe to a screenwell located on the shore where trash and debris is removed. The essentially debris free water is then pumped through the condenser cooling tubes and returned to the body of water. One problem associated with these systems is that the intake structure forms an artifical reef which attracts fish. Although various improvements in the design of the intake structure have been developed to avoid drawing in fish with the intake water, some fish are still drawn into the intake pipe and are carried with the flow of water to the watercourse associated with the screenwell and the following pumpwell.

In the screenwell, a conventional method of screening debris and fish also in the water flowing through the watercourse involves the use of vertically traveling screens arranged across the intake watercourse perpendicular to the flow of the water therein. The debris in the water impinges upon the screens and is then carried up out of the water to a collection area where it is removed from the screen. However, the fish are merely left in the screenwell and unless removed will be destroyed during the cleaning process of the screenwell area. Moreover, even if removal of the fish from the screenwell is effected such heretofore used screen systems are otherwise undersirable. Fish drawn into such systems also become impinged upon the screens. Impingement of the fish for any period of time is detrimental to the fish in that they often become weakened due to disease or fall victim to predators while in their weakened condition.

In order to prevent injury to fish drawn into a watercourse it has been proposed to induce them to leave the watercourse by the provision of an attractive quiet area or areas of water substantially free of directional current adjacent the watercourse. Such a quiet area system is set forth in U.S. Pat. No. 3,820,342, issued June 8, 1974 to now U.S. Pat. No. 3,820,342 Jerome A. Stipanov, a fellow employee of the present inventor at Southern California Edison Company.

Quiet area systems are most suitable for use where the primary species of fish expected to be encountered in the watercourse include those that will congregate in a quiet area and not attempt to re-enter the watercourse. However, certain species of fish will not remain in a quiet area but rather will continually attempt to re-enter the flow of water in the watercourse. This activity can result in such fish re-entering the watercourse in a fatigued state to become eventually impinged upon or in some instance depending on the design of the diversion structure actually pass through the structure.

Therefore it is an object of the present invention to provide a fish holding chamber into which fish drawn in with the water of a water intake system can be collected and remain unharmed until they can be removed and returned to the body of water.

SUMMARY OF THE INVENTION

The fish holding chamber of the present invention includes inlet means communicating with a watercourse through which water in a water intake system flows and outlet means for removing water from the chamber whereby a flow of water is created from the watercourse into and out of the chamber. A baffle is located between the inlet means and the outlet means to provide a quiet area of water in the holding chamber substantially free of directional water current and relatively fast moving streams of water about the quiet area. Fish enter the chamber by the flow of water and are caused to congregate in the quiet area. The fish may then be removed from the quiet area, as for example by lifting the fish in a basket which is raised from underneath the fish in the quiet area out of the water in the chamber for return to the body of water.

The fish holding chamber of the invention is particularly suitable for use with a fish bypass guide channel having an entrance communicating with the watercourse and an exit removed from the watercourse communicating with the fish holding chamber. The bypass guide channel is designed to receive a flow of water from the watercourse and direct it to the entrance of the fish holding chamber without creating any substantial areas of turbulence in the water flowing from the watercourse to the fish holding chamber. By such a bypass guide channel fish may be induced to leave the watercourse and be transported to the fish holding chamber.

One form of a fish bypass guide channel includes smoothly tapering dimensions from entrance to exit such that the velocity of the water flowing through the channel is increasingly greater than the velocity of the water approaching the fish diversion structure and includes a curved portion along its length of sufficient degree of curvature so that there is no direct line of sight from the portion of the channel near the entrance to the fish holding chamber to the portion of the channel near the watercourse. A fish bypass guide channel of this preferred design is the subject of a separate companion U.S. Pat. appln., Ser. No. 436,012, entitled FISH BYPASS GUIDE CHANNEL filed Jan. 23, 1974 in the names of Lory E. Larson, a fellow empoloyee of the inventor herein, and Victor J. Schuler.

Both the fish bypass guide channel of the Larson et al application, Ser. No. 436,012, and the fish holding chamber which is the subject of this application are also particularly suitable for use with a fish diversion structure having a continuous flush face across the front thereof and mounted across the watercourse at an angle of about 30° or less with respect to the direction of flow wherein the flush face of the structure is generally defined by the upstream face of support piers and the upstream face of each assembly of adjacent and vertically traveling rectangular frames positioned between the piers. Each frame includes a plurality of vertically extending and laterally spaced louver bars mounted with the side faces thereof extending substantially perpendicular to the plane of the flush face of the structure. The front of the frame and the front edges of the louver bars from which the side faces thereof extend define the front face of the assembly. Such a fish diversion structure is the subject of a separate companion U.S. Pat. appln., Ser. No. 436,013, entitled WATER INTAKE AND FISH CONTROL SYSTEM filed Jan. 23, 1974 in the name of Dallas I. Downs, the inventor herein, Lory E. Larson, a fellow employee of the inventor herein and Victor J. Schuler.

DETAILED DESCRIPTION OF THE INVENTION

Figure 1:
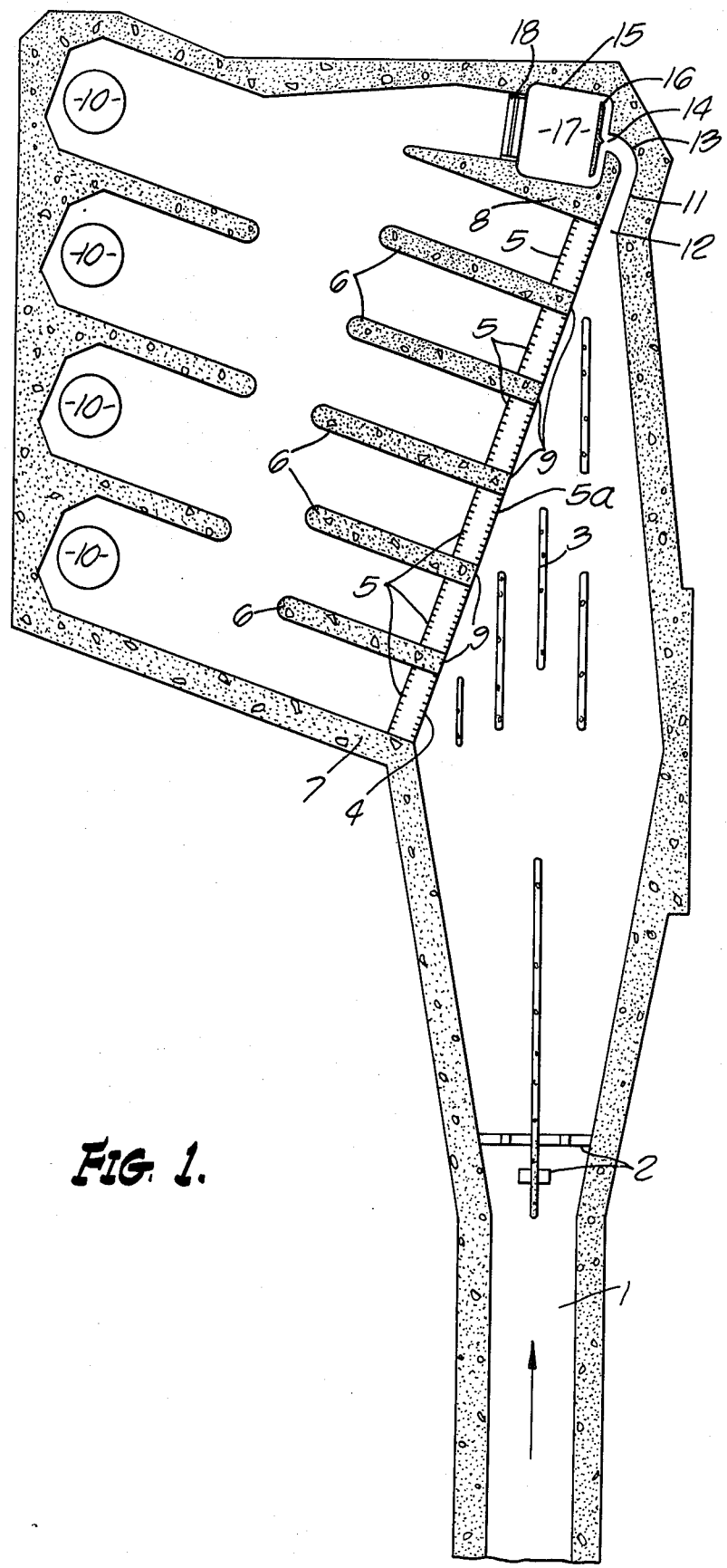
FIG. 1 is a top plan view schematically illustrating the fish holding chamber of the present invention in a water intake system.

Referring first to the over all water intake system and in particular to FIG. 1, water, from a body of water (not shown) containing fish and debris enters a watercourse 1 and flows past baffles 2 and guiding vanes 3 to a fish diversion structure, generally designated 4. The fish diversion structure 4 is mounted across watercourse 1 at an angle of 20° with respect to the direction of flow towards the diversion structure. The baffles 2 and guiding vanes 3 insure that the angle of approach of the water to the fish diversion structure is about 20° across the entire face of the structure and that a uniform approach velocity is maintained. It is understood that the baffle and guiding vane arrangement depicted in FIG. 1 is not essential to the operation of the fish diversion structure but that any hydraulic design to maintain the desired approach velocity and angle would be equally suitable.

Fish diversion structure 4 as depicted in FIG. 1 comprises an array of six assemblies 5 of adjacent, vertically traveling rectangular frames each having a plurality of vertically extending, laterally spaced louver bars mounted in a plane substantially perpendicular to the front plane of the diversion structure 4. The front edges of the louver bars and the front of the frames define a continuous flush face across the front of each traveling frame assembly. The traveling frame assemblies 5 are positioned between support piers 6 and watercourse walls 7 and 8. It is important that the front faces 9 of support piers 6 and the front faces of traveling frame assemblies 5 are flush to define a continuous flush face across fish diversion structure 4. The louver bars act to sharply turn the direction of flow of the water in watercourse 1 as it passes through the fish diversion structure. The water then flows to pumpwells and circulating water pumps 10.

Preferably, the flush faces of the traveling frame assemblies 5 are provided with a screen mounted thereacross to provide a single assembly which also effects the screening of debris from the water passing through traveling frame assemblies 5. If such screens are not employed debris which passes through unscreened traveling frame assemblies could be removed from the water by a much more costly system of conventional traveling screens placed downstream of the traveling frame assemblies. Such a screen/louver assembly is the subject of companion U.S. Pat. appln., Ser. No. 436,011, entitled IMPROVED FISH DIVERSION MEANS, filed Jan. 23, 1974 in the name of Dallas I. Downs, the inventor herein.

Fish removal means including the fish holding chamber herein are located at the end of the continuous flush face of the diversion structure. These means comprise a fish bypass guide channel 11 having an entrance 12, curved section 13 and exit 14 communicating with the fish holding chamber 15. A small portion of the water flowing through watercourse 1 to circulating pumps 10 is diverted through fish bypass guide channel 11 and into fish holding chamber 15 where it impinges upon baffle 16 before exiting through a conventional traveling screen assembly 18. The baffle 16 creates a quiet area of water 17 behind the baffle and relatively fast currents of water about the quiet area whereby fish entering the holding chamber 15 are maintained and congregate in the quiet area from which they may be readily removed and returned to the body of water from which they were withdrawn.

Figure 2:
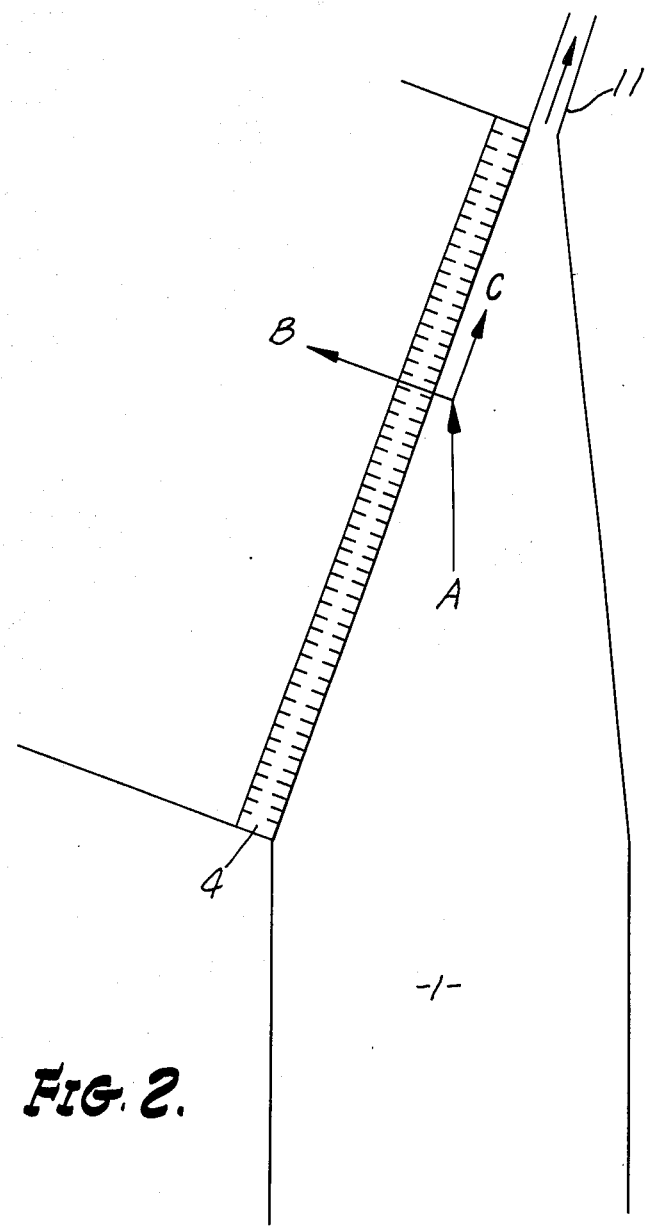
FIG. 2 is a schematic illustration of the flow characteristic of a fish diversion structure suitable for use with the invention herein.

The continuous flush face of the fish diversion structure and angle to the flow at which it is placed combine with orientation of the louver bars in the traveling frame assembly to effect the velocity components shown schematically in FIG. 2, and thereby satisfactorily guide or divert the fish in the direction of the fish holding chamber.

Referring to FIG. 2, water in watercourse 1 having horizontal velocity component A approaches fish diversion structure 4 at an angle of about 30° or less and preferably of about 20° or less. The louver bars in fish diversion structure 4 as a result of the sides thereof being angled as shown with respect to the direction of incoming flow sharply turn the major portion of the flow of water in the direction of horizontal velocity component B. At the same time there is created horizontal velocity component C along the flush face of the fish diversion structure 4 toward fish bypass guide channel 11. Component C is much smaller in magnitude than component B. However, it is velocity component C established along the face of fish diversion structure 4 that is believed to be a material factor in causing fish in watercourse 1 approaching fish diversion structure 4 to be diverted or guided downstream along the flush face of the diversion structure. It is believed that the fish in watercourse 1 sense velocity component C and react to it thereby avoiding the fish diversion structure and remaining at a distance from the face thereof.

Fish collected in the chamber may be removed by any suitable removal means and returned to the body of water. For example, it has been found that fish congregating in quiet area 17 may be lifted by means of a basket from whence they can be placed in a fish return conduit and returned to the body of water. Fish pumps or a method of isolating and flushing the collection area might also be employed to return the fish to the body of water.

The fish holding chamber disclosed herein is suitable for use with any type of fish diversion structure or even with conventional traveling screen arrangements. The chamber can be employed to collect fish which would also enter a quiet area unremoved from the watercourse. However, the chamber is particularly suitable for use with intake systems where species of fish are encountered which must be induced to leave a watercourse by a flow of water. For example where the water intake system is to be used in Southern California ocean waters, the major species of fish expected to be drawn into the system are Northern Anchovy, Queen Fish, White Croaker, Shiner Perch and Walleye Surfperch. Of these, Anchovy in particular will not remain in a quiet area open to the watercourse. Therefore the holding chamber herein is particularly suitable for systems using those waters.

The entrance to the fish holding chamber may communicate directly with the watercourse. However with some species of fish, e.g., Anchovy, better results are obtained by providing a guide channel between the watercourse and the entrance to the holding chamber. Any channel having non-turbulent flow will suffice. However particularly effective results in inducing fish to leave the watercourse are provided by the fish bypass guide channel of Larson et al, Ser. No. 436,012 and depicted in detail in FIG. 3 herein.

Figure 3:
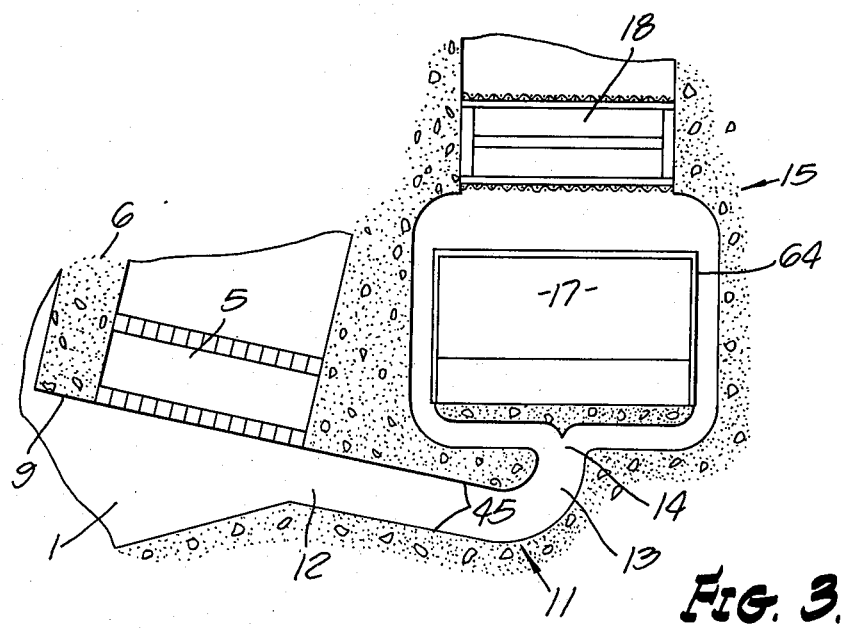
FIG. 3 is illustrating in top plan view a preferred form of the fish bypass guide channel suitable for use with the fish holding chamber of the invention.

Referring now to FIG. 3, the fish bypass guide channel 11 has an entrance 12 communicating with watercourse 1 to receive a flow of water from the watercourse and exit 14 removed from the watercourse and communicating with fish holding chamber 15. The walls 45 of the guide channel from entrance 12 to exit 14 have smoothly tapering dimensions such that the velocity of the water flowing through the channel is increasingly greater than the velocity of the water approaching the fish diversion structure. In extending from watercourse 1 to fish holding chamber 15, walls 45 are sufficiently smooth and their angle of departure from the walls of watercourse 1 sufficiently small at entrance 12 as to prevent any substantial turbulence in the water flowing through bypass channel 11.

Bypass channel 11 is also provided with a curved section 13 between entrance 12 and exit 14. Curved section or portion 13 is of a sufficient degree of curvature so that there is no direct line of sight from the portion of the channel near entrance 12 to the portion of the channel near exit 14. Preferably curved portion 13 effects a curve of about 90° between inlet 12 and exit 14. However the degree of curvature may vary so long as it is sufficient to prevent fish from seeing other upstream fish after entering the channel and thereby attempting to swim back out of the channel again.

The desired increase in velocity to be obtained by the tapering of walls 45 also depends upon the species of fish which are being induced to enter the bypass channel. For example, for species of fish expected to be encountered in Southern California coastal waters an increase in velocity of at least about 0.5 feet per second over the approach velocity of the water to the fish diversion structure provides superior results in inducing such fish to enter and pass through the bypass channel. A velocity change of greater than 0.5 feet per second tends to cause a proportional increase in avoidance of the bypass channel by some species of fish. With fish of other species an increase in velocity of a smaller magnitude may still provide suitable results.

Figure 4:
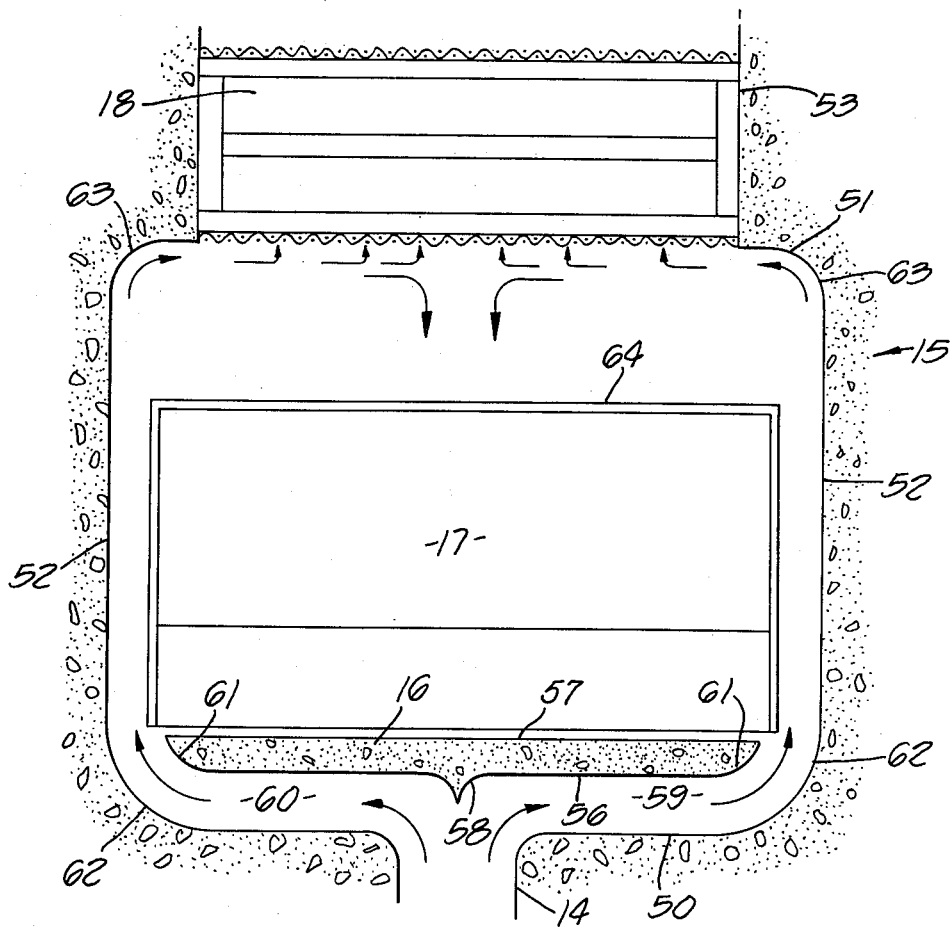
FIG. 4 is an enlarged top plan view of the fish holding chamber of the invention.

Moreover, while fish in some instances might be induced to enter and pass through a bypass channel not designed to result in an increase in velocity over the length thereof such an increase provides for better results in inducing fish to enter the channel and insures that fish arrive in the holding means at the exit of the channel sooner and in a better condition.

Where fish diverted by a fish diversion structure are induced to leave the watercourse of a water intake system by water flowing through a guide channel located at one end of the fish diversion structure, flow through the bypass channel may be maintained either by connecting the bypass channel to the main circulating pumps in the pumpwell or by auxiliary pump means. In either case however, it is still necessary to screen the fish from the water before they reach the pumps. For this purpose a fish holding chamber as shown in FIGS. 3 and 4 is employed. The chamber collects the fish from the water of the bypass channel whereby the fish may then be readily removed from the holding chamber and returned to the body of water.

The fish holding chamber provides a baffle upon which the flow of water entering the chamber impinges. The baffle is located between the entrance to the chamber and the water exit from the chamber and creates a "quiet area" of water with a current of water moving thereabout. Fish which enter the holding chamber are maintained and congregate in the quiet area of water. Certain fish are attracted to the quiet area of water while other fish tend to stray out of the quiet area. Such strays when outside the quiet area are subject to the current of water moving thereabout and thus diverted back to the quiet area. Fish in the quiet area readily submit themselves to being removed therefrom. For example, they may be lifted by a basket traveling from the bottom of the chamber to above the surface of the water from where they may be removed unharmed and returned to the body of water.

Referring to FIG. 4, an essentially rectangular fish holding chamber 15 is provided having a frontside 50, a back wall 51 and sides 52. An entrance 14 is located substantially in the center of frontside 50. Entrance 14 corresponds to exit 14 of fish bypass guide channel 11. The back wall 51 is provided with water exit 53 having conventional traveling screen means 18 positioned thereacross. The fish holding chamber 15 is also provided with a baffle 16 having a frontside 56 and a backside 57 with a protrusion 58 located essentially in the center of frontside 56. The baffle 16 is positioned in fish holding chamber 15 to define the inlet into channels 59 and 60 each of which have a cross-sectional flow area approximately one-half the cross-sectional flow area of entrance 14.

Water entering chamber 15 through entrance 14 impinges upon protrusion 58 and is divided into two essentially equal streams each having approximately the same velocity as the water flowing through entrance 14. Alternatively, protrusion 58 is movable along frontside 56, so that it may easily be positioned to divide the flow substantially in half. The ends 61 of baffle 16 and the front corners 62 of the chamber are sized and curved so that water flowing in channels 59 and 60 is turned around the corners without substantial turbulence or increase in velocity. This arrangement results in the water flowing along the sides 52 in a channel of current within the water not substantially larger than channels 59 and 60. The back corners 63 of chamber 15 are also smoothly curved to turn the flow of water such that two oppositely directed currents of water flow across the face of the screens in traveling screen means 18. Traveling screen means 18 of chamber 15 is chosen of sufficient size such that the current of flow across the face of the screens is relatively strong in comparison to the flow through the screens.

The fish holding chamber also provides an area 17 of essentially quiet water behind baffle 16 in which no constant vectors of current are noted. Fish entering the holding chamber are maintained in the quiet area 17 and can be kept there for several days without harm to the physical condition of the fish. In addition, two relatively strong oppositely directed vectors of flow are created across the face of the exit screen 18. These vectors are sufficiently strong to prevent any undesired impingement of fish on the screen. The vectors intersect at a meeting point to direct fish back to the quiet area. Thus fish which stray from quiet area 17 either sense the relatively strong currents along the sides 52 and return to the quiet area or are swept with the current along corners 63, and across the face of the exit screen and are returned to the quiet area by the current vectors.

The desirable flowrate of water through traveling screens 18 in exit 51 of fish holding chamber 15 is determined by the characteristics of the species of fish expected to be encountered in the intake water. For example, with the species of fish expected to be encountered in Southern California coastal waters it was readily determined that with an inlet flow of water through entrance 14 of about 3.0 feet per second the provision of exit screen 18 of sufficient size so that the average flowrate therethrough is about 0.8 feet per second resulted in the sufficiently strong vector of current across the face of exit screens 18 to prevent any fish and most debris from being impinged upon the screen.

The fish maintained in quiet area 17 can then be removed from the fish holding chamber 15 by various methods at least some of which are set forth in the previously identified Stipanov U.S. Pat. No. 3,820,342. One other method of accomplishing such removal is by an elevator basket apparatus. The basket 64 normally rests on the bottom of chamber 15 underneath the quiet area of water. When a sufficient number of fish have congregrated in the quiet area 17 the elevator basket 64 may be slowly raised. The fish remain in the elevator basket as it is drawn above the surface of the water and are then removed therefrom and returned to the main body of water.

Figure 5:
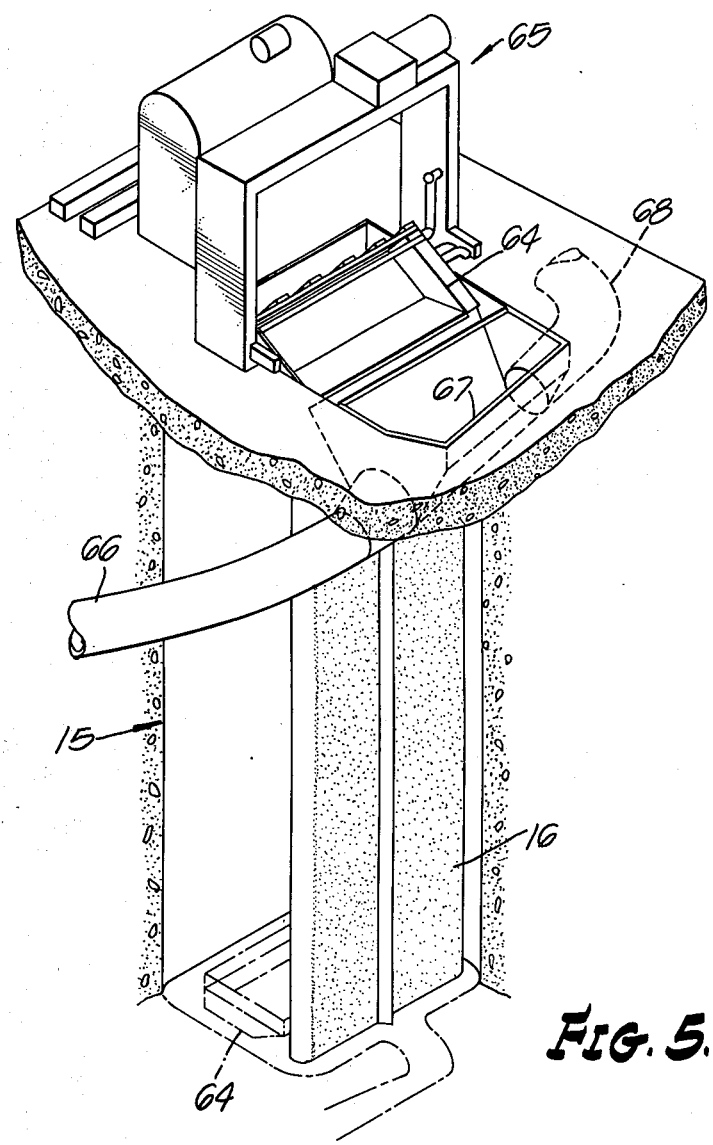
FIG. 5 is a perspective view illustrating suitable fish return means for returning the fish to the body of water from the fish holding chamber.
Figure 6:
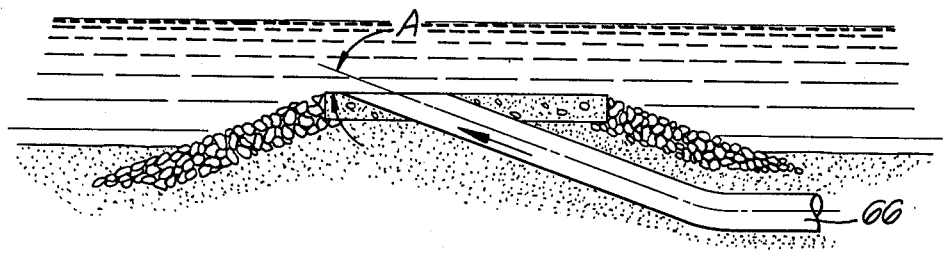
FIG. 6 is a side sectional view of a fish discharge conduit of the fish return means.

The elevator apparatus is depicted in FIG. 5. Since the particular design of elevator basket 64 or the return means do not form a part of the invention herein they are disclosed and described only generally. In FIG. 5 fish elevator basket 64 is shown in its raised position having been lifted by lifting means 65. Fish return conduit 66 is provided with opening 67 below the raised position of basket 64 and with a flow of water from water inlet 63. The fish are dumped from basket 64 into the water flowing through opening 67 and are swept into fish conduit 66. The velocity of the water flowing through fish conduit 66 should be sufficient to insure that none of the fish can swim against the current of flow and remain in the conduit. For example for species of fish encountered in Southern California waters it was readily determined that a flow of 5.0 feet per second would result in all fish entering conduit 66 being washed therefrom. The fish are discharged from fish return conduit 66 into the main body of water. As shown in FIG. 6 the conduit is preferably placed under the floor of the body of water and then directed upward an angle A of about 20° from the floor. The angle of 20° may vary and any angle which does not result in undue depressurization of the fish, as would result if they were discharged vertically upward, is satisfactory.

Having fully described the invention, it is to be understood that the invention herein is not limited to the details of the embodiments herein set forth or to the details illustrated in the drawings but the invention is of the full scope of the appended claims.

I claim:

1. A fish holding chamber comprising:
    an enclosure through which water normally flows substantially in the horizontal direction having a pair of side walls and a back wall, said back wall being partially defined by normally open water removal through which water exits the chamber;
    means for creating substantially equal horizontal currents of water flowing along each of said side walls and substantially equal but opposite horizontal currents of water flowing across said back wall, said latter currents being strong relative to the horizontal flow of water through said water removal means; and
    a relatively quiet water area substantially free of constant horizontal water currents in said enclosure, said area being defined by said currents.

2. The chamber of claim 1 wherein said enclosure communicates with a flowing stream of water and said means for creating substantially equal currents includes a baffle positioned to intercept said flowing stream and divert the water therein into two separate streams flowing adjacent to said side walls.

3. The chamber of claim 1 wherein said side walls are joined to said back wall by smoothly curving wall portions.

4. The chamber of claim 2 wherein said enclosure is further defined by a front wall, said front wall having an opening therein to communicate said flowing stream with said enclosure, said baffle being positioned in said enclosure immediately adjacent to said front wall.

5. The chamber of claim 4 wherein said baffle cooperates with said front wall to form a pair of oppositely directed flow channels, each of said channels having a cross-sectional flow area approximately one-half the cross-sectional flow area of said opening in said front wall.

6. The chamber of claim 5 wherein said side walls are joined to said front wall by smoothly curving wall portions.

7. The chamber of claim 6 wherein means are provided for removing fish from said relatively quiet water area.

8. A fish holding chamber comprising:
    an enclosure through which water normally flows substantially in the horizontal direction having a front wall, a back wall, two generally parallel side walls, and smoothly curving wall portions joining said walls to said front and back walls, said back wall being partially defined by normally open water removal means through which water exits the chamber and said front wall having an opening therein intermediate said side walls;

a conduit communicating with said opening and delivering a flowing stream of water thereto; and a baffle positioned in said enclosure adjacent to said front wall for intercepting said flowing stream of water and diverting it into two substantially equal but oppositely flowing horizontal currents of water which follow the contours of said walls, said currents being strong relative to the horizontal flow of water through said water removal means, said currents together with the rear face of said baffle defining a relatively quiet water area substantially free of constant horizontal water currents in said enclosure.

9. The chamber of claim 8 wherein means are provided for removing fish from said relatively quiet water area.

10. A method of establishing a relatively quiet water area substantially free of constant horizontal water currents in a chamber from which fish can be removed comprising:

introducing a substantially horizontal flowing stream of water into a first portion of said chamber;

separating said stream of water in said chamber into two substantially equal counter-current streams traveling adjacent to the walls of said chamber in the horizontal direction and meeting at a portion of said chamber remote from said first portion thereof; and continuously removing water from said remote portion of said chamber at a flow rate substantially less than that of said counter-current streams whereby a relatively quiet water area substantially free of constant horizontal water currents is defined by said counter-current streams.

11. A fish holding structure, comprising:

a chamber through which water normally flows substantially in the horizontal direction including water inlet means and normally open water outlet means through which water exits the chamber;

a screening means across said water outlet means preventing a passage of fish and debris therethrough; and means for creating a horizontal current of water along said screening means for preventing the impingement of fish on said screening means, said current being strong relative to the flow of water through said screening means into said water outlet means.

12. The structure of claim 11, wherein said chamber is defined by a front wall wherein said inlet means is disposed, a back wall wherein said outlet means is disposed and side walls therebetween.

13. The structure of claim 12, wherein said means creates horizontal currents of water flowing along said sidewalls and said chamber includes a relatively quiet water area substantially free of constant horizontal water currents bounded by said currents along said sidewalls and said screening means.

14. A fish holding structure, comprising:

a chamber through which water normally passes substantially in the horizontal direction being defined by a front wall including water inlet means, a pair of sidewalls and a backwall including normally open water outlet means into which the water passes;

screening means across said water outlet means preventing the passage of fish and debris therethrough;

means for creating substantially equal horizontal currents of water flowing along each said sidewall and substantially equal but opposite horizontal currents of water flowing across said backwall adjacent said screening means to prevent the impingement of fish thereon, said currents across said backwall being strong relative to the flow of water passing into said water outlet means; and a relatively quiet water area in said chamber substantially free of constant horizontal water currents bounded by said currents wherein fish are retained.

15. In a water intake system including means for screening fish having an upstream facing front face through which the water flows, the improvement comprising means for creating a horizontal current of water flowing along said front face of said screening means for preventing the impingement of fish thereon, said current being strong relative to the water flowing through said screening means.

16. The system of claim 15, wherein said current creating means causes said relatively strong horizontal current of water to flow away from said screening means.

17. A fish control structure, comprising:

sidewalls defining a chamber for receiving and maintaining fish, said chamber being in communication with a body of water from which fish are to be diverted, said sidewalls having an entrance to receive a constant flow of water and any fish therein from said body of water into said chamber and a normally open exit through which water flows from said chamber; and means for creating along each said sidewall and across said exit a stream of flowing water from said entrance with said stream moving along each said sidewall and across said exit and moving circumferentially about and defining a quiet zone of water, the velocity of any flow of water in said quiet zone being substantially less than the velocity of the flow of water in the stream along each said sidewall and across said exit whereby at least certain fish diverted into said chamber are caused to be maintained in said quiet zone.

* * * * *